US012800521B2

(12) United States Patent
Urchuk et al.

(10) Patent No.: US 12,800,521 B2
(45) Date of Patent: Nov. 17, 2026

(54) DETERMINING PHYSICAL PROPERTIES OF ITEMS INPUT TO AN X-RAY SCANNER SYSTEM, AND RELATED SYSTEMS, METHODS AND APPARATUSES

(71) Applicant: Analogic Corporation, Peabody, MA (US)

(72) Inventors: Steven Urchuk, Melrose, MA (US); Steven Weed, Marblehead, MA (US); David Schafer, Rowley, MA (US)

(73) Assignee: Analogic Corporation, Peabody, MA (US)

( * ) Notice: Subject to any disclaimer, the term of this patent is extended or adjusted under 35 U.S.C. 154(b) by 80 days.

(21) Appl. No.: 18/472,860

(22) Filed: Sep. 22, 2023

(65) Prior Publication Data

US 2024/0102948 A1 Mar. 28, 2024

Related U.S. Application Data

(60) Provisional application No. 63/376,709, filed on Sep. 22, 2022.

(51) Int. Cl.
*G01N 23/083* (2018.01)
*G01G 11/04* (2006.01)
*G01N 23/046* (2018.01)
*G06Q 10/02* (2012.01)

(52) U.S. Cl.
CPC ........... *G01N 23/083* (2013.01); *G01G 11/04* (2013.01); *G01N 23/046* (2013.01); *G06Q 10/025* (2013.01); *G01N 2223/643* (2013.01)

(58) Field of Classification Search
CPC .... G01G 11/04; G01N 23/046; G01N 23/083; G01N 2223/643; G06Q 10/025
See application file for complete search history.

(56) References Cited

U.S. PATENT DOCUMENTS

| | | | | |
|---|---|---|---|---|
| 3,478,830 A * | 11/1969 | Haeflein | G01G 11/043 | 177/16 |
| 3,631,963 A * | 1/1972 | Smith | B65G 47/54 | 198/525 |
| 4,143,756 A * | 3/1979 | Chorlton | B65G 13/10 | 198/787 |

(Continued)

FOREIGN PATENT DOCUMENTS

| | | | |
|---|---|---|---|
| CA | 2204010 A1 | 5/1996 | |
| EP | 3533683 A1 * | 9/2019 | B62B 3/02 |

(Continued)

OTHER PUBLICATIONS

International Search Report of International Application No. PCT/US2023/074911, mailed Jan. 5, 2024, 5 pages.

(Continued)

*Primary Examiner* — Blake C Riddick
(74) *Attorney, Agent, or Firm* — TraskBritt

(57) ABSTRACT

A method may include generating, via radiation, an image representing an object; determining physical properties of the object; and associating determined physical properties of the object with one or more of: the image generated by the X-ray scanner system, a segmented image from the image generated by the X-ray scanner system, or a passenger identifier.

18 Claims, 7 Drawing Sheets

(56) References Cited

U.S. PATENT DOCUMENTS 4,841,554 A * 6/1989 Doenges .................. H05G 1/02 250/359.1
4,870,670 A * 9/1989 Geus .................... G01N 23/083 378/57
4,884,289 A * 11/1989 Glockmann ............. G01V 5/22 378/57
5,217,109 A * 6/1993 Youren ................ B65G 47/263 198/781.06
5,796,802 A * 8/1998 Gordon .................. G01V 5/226 378/97
6,317,509 B1 * 11/2001 Simanovsky .......... G01V 5/226 250/363.04
6,321,586 B1 * 11/2001 Wojtowicz ............... G01N 3/56 73/9
2004/0120454 A1 * 6/2004 Ellenbogen ............ G01V 5/226 378/57
2005/0117700 A1 * 6/2005 Peschmann ............ G01V 5/222 378/57
2005/0195939 A1 * 9/2005 Scheinman .......... G01N 23/046 378/57
2006/0055400 A1 * 3/2006 Safai ...................... G01N 23/04 324/232
2006/0098773 A1 * 5/2006 Peschmann ............ G01N 23/04 378/57
2006/0140340 A1 * 6/2006 Kravis ................... G01V 5/224 378/57
2006/0198495 A1 * 9/2006 Ellenbogen ............ G01V 5/226 378/57
2006/0274879 A1 * 12/2006 Ellenbogen ............ G01V 5/226 378/19
2007/0003009 A1 * 1/2007 Gray ........................ G01V 5/20 378/57
2007/0133743 A1 * 6/2007 Johnson .................. B64F 1/368 378/57
2007/0147581 A1 * 6/2007 Ellenbogen ............ G01V 5/224 378/19
2007/0230657 A1 * 10/2007 Garms ................... G01V 5/226 378/57
2007/0280502 A1 * 12/2007 Paresi .................... G01V 5/271 382/100
2008/0025461 A1 * 1/2008 Foland ................. G01N 23/046 378/4
2008/0025464 A1 * 1/2008 Foland ................... G01N 23/04 378/57
2008/0056444 A1 * 3/2008 Skatter ................... G01V 5/224 378/57
2008/0198967 A1 * 8/2008 Connelly ................. G01V 5/22 378/57
2009/0034790 A1 * 2/2009 Song ...................... G01V 5/226 378/10
2009/0245463 A1 * 10/2009 Schlomka .............. G01V 5/226 378/57
2009/0285353 A1 * 11/2009 Ellenbogen ............ G01V 5/226 378/57
2010/0046704 A1 * 2/2010 Song ...................... G01N 23/04 378/57
2010/0220835 A1 * 9/2010 Gibson .................... G01V 5/22 378/53
2010/0223016 A1 * 9/2010 Gibson ................ G01N 23/046 702/28
2010/0277312 A1 * 11/2010 Edic ....................... G01V 5/222 378/57
2011/0019797 A1 * 1/2011 Morton ................ G01N 24/084 378/57
2011/0206240 A1 * 8/2011 Hong .................. G06F 18/2135 382/103
2012/0213331 A1 * 8/2012 Peschmann ............ G01V 5/222 378/57
2012/0230463 A1 * 9/2012 Morton ............ G01N 23/20083 382/131
2013/0170611 A1 * 7/2013 Beckmann ............. G01V 5/226 378/9
2013/0251098 A1 * 9/2013 Morton ................. H01J 35/045 378/10
2014/0062709 A1 * 3/2014 Hyer ...................... G01G 11/00 177/16
2016/0025888 A1 * 1/2016 Peschmann ............ G01V 5/228 378/57
2017/0131428 A1 * 5/2017 Langeveld ............. G01V 5/224
2018/0292565 A1 * 10/2018 Hanley .................. G01V 5/224
2020/0193666 A1 * 6/2020 Cinnamon ............ G06T 1/0007
2021/0153834 A1 * 5/2021 Urchuk ................ G01N 23/046
2021/0323696 A1 10/2021 Zhang et al.
2023/0298295 A1 * 9/2023 Sivakumar ............. G01N 23/10 345/419

FOREIGN PATENT DOCUMENTS

JP 2011-072886 A 4/2011
WO WO-9613839 A1 * 5/1996 ............. G01N 23/04

OTHER PUBLICATIONS

Written Opinion of the International Searching Authority of International Application No. PCT/US2023/074911, mailed Jan. 5, 2024, 11 pages.

* cited by examiner

DETERMINING PHYSICAL PROPERTIES OF ITEMS INPUT TO AN X-RAY SCANNER SYSTEM, AND RELATED SYSTEMS, METHODS AND APPARATUSES

CROSS-REFERENCE TO RELATED APPLICATION

This application claims the benefit under 35 U.S.C. § 119(e) of U.S. Provisional Patent Application Ser. No. 63/376,709, filed Sep. 22, 2022, the disclosure of which is hereby incorporated herein in its entirety by this reference.

BACKGROUND

Airlines measure the weight of baggage (e.g., luggage, packages, other containers without limitation) submitted for transit in the hold of an aircraft ("hold baggage"). Measuring baggage weight ensures that baggage is handled safely, ensures that fees may be collected for overweight/oversize baggage, and enables airline personnel to perform loading calculations and management (e.g., space required for loading, carrying capacity, or weight balance, without limitation).

Items that a passenger carries with them, potentially onto an aircraft, are typically screened by an X-ray scanning system prior to aircraft boarding. Examples of passenger items include: luggage, backpacks, purses, clothing, wallets, keys, and personal electronics. These passenger items may also be referred to as "accessible property" because they are generally accessible to a passenger while on an aircraft.

Hold baggage can be measured using optical gauging systems because hold baggage are screened individually, unlike accessible property, which is a mixture of luggage and other items that are sometimes screen together (e.g., in the same tray, without limitation) and sometime screen separately (e.g., in different trays, without limitation).

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1A:
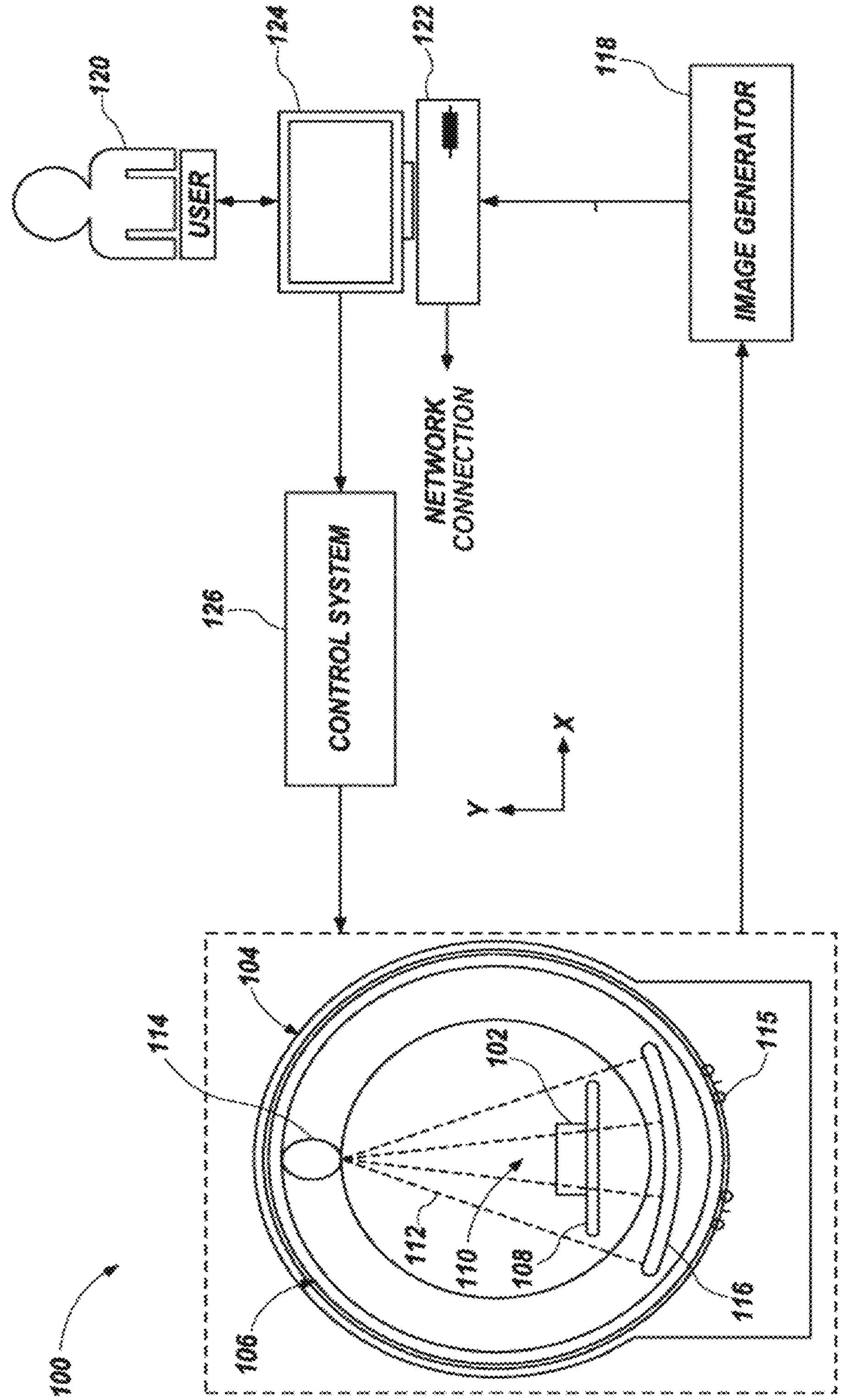
FIG. 1A is a schematic diagram depicting an X-ray scanner system configured to perform CT scanning.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," without limitation, is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

FIG. 1A is a schematic diagram depicting an X-ray scanner system 100 configured to perform CT scanning. Techniques in accordance with this disclosure may find applicability with, as non-limiting examples: CT systems, line-scan systems, digital projection systems, X-ray diffraction systems, and/or other systems comprising a radiation detector system.

The X-ray scanner system 100 may be configured to examine one or more objects 102 (e.g., a series of objects, such as suitcases at an airport, freight, or parcels, without limitation). The X-ray scanner system 100 may include, for example, a stator 104 and a rotor 106 rotatable relative to the stator 104. During an examination, object(s) 102 may be located on a support 108, such as, a bed or conveyor belt, without limitation, that is selectively positioned in an examination region 110 (e.g., a hollow bore in the rotor 106 in which the object(s) 102 is exposed to radiation 112, without limitation), and the rotor 106 may be rotated about the object(s) 102 by a rotator 115 (e.g., motor, drive shaft, chain, etc.).

The rotor 106 may surround a portion of the examination region 110 and may be configured as, for example, a gantry supporting at least one radiation source 114 (e.g., an ionizing X-ray source, gamma-ray source, without limitation) oriented to emit radiation toward the examination region 110 and at least one radiation detector 116 supported on a substantially diametrically opposite side of the rotor 106 relative to the radiation source(s) 114. During an examination of object(s) 102, the radiation source(s) 114 emit shaped radiation 112 (e.g., radiation exhibiting a fan shaped configuration, cone shaped configuration, or both without limitation) into the examination region 110. The radiation 112 may be emitted, as a non-limiting example, at least substantially continuously or intermittently (e.g., a pulse of radiation 112 followed by a resting period during which the radiation source(s) 114 is not activated, and optionally followed by a further pulse of radiation 112, without limitation).

As the emitted radiation 112 traverses the object(s) 102, the radiation 112 may be attenuated differently by different aspects of the object(s) 102. Because different aspects attenuate different percentages of the radiation 112, an image or images can be generated based upon the attenuation, or variations in the number of radiation photons that are detected by the radiation detector 116. For example, more dense aspects of the object(s) 102, such as an inorganic material, may attenuate more of the radiation 112 (e.g., causing fewer photons to be detected by the radiation detector 116, without limitation) than less dense aspects, such as organic materials.

The radiation detector(s) 116 may include, for example, many individual detector elements arranged in a pattern (e.g., a row or an array, without limitation) on one or more detection assemblies (also referred to as detection modules, detector modules, and/or the like), which are operatively connected to one another to form the radiation detector(s) 116. In one or more embodiments, the detector elements may be configured to indirectly convert (e.g., using a scintillator array and photodetectors) detected radiation into analog signals. Further, as described below, the radiation detector(s) 116, or detection assemblies thereof, may comprise electronic circuitry, such as, for example, an analog-to-digital (A/D) converter, configured to filter the analog signals, digitize the analog signals, and/or otherwise process the analog signals and/or digital signals generated thereby. Digital signals output from the electronic circuitry may be conveyed from the radiation detector 116 to digital processing components configured to store data associated with the digital signals and/or further process the digital signals.

In some embodiments, the digital signals may be transmitted to an image generator 118 configured to generate image space data, also referred to as "images," from the digital signals using a suitable analytical, iterative, and/or other reconstruction technique (e.g., back-projection reconstruction, tomosynthesis reconstruction, iterative reconstruction, without limitation). In this way, the data associated with the digital signals may be converted from projection space to image space, a domain that may be more understandable by a user 120 viewing the image(s), for example. Such image space data may, as non-limiting examples, depict a two-dimensional representation of the object(s) 102 and/or a three-dimensional representation of the object(s) 102. In other embodiments, the digital signals, images, or both may be transmitted to other digital processing components, such as a threat analysis analyzer (not depicted), for processing.

X-ray scanner system 100 may also include a terminal 122 (e.g., a workstation or other computing device, without limitation), configured to receive the image(s) (e.g., images generated by image generator 118, without limitation), which may be displayed on a monitor 124 to the user 120 (e.g., security personnel, medical personnel, without limitation). In this way, the image(s) are inspectable (e.g., by a threat analyzer (e.g., a user, a digital processing component, without limitation)) to identify areas of interest within the object(s) 102. The terminal 122 may be configured to receive user input which may direct operations of the X-ray scanner system 100 (e.g., a rate at which the support 108 moves, activation of the radiation source(s) 114, without limitation). The terminal 122 may be operably coupled to additional terminals 122 via a network (e.g., via a local area network or the Internet, without limitation).

A control system 126 may be operably coupled to the terminal 122. The control system 126 may be configured to automatically and dynamically control (e.g., via command signals generated by control system 126, without limitation) at least some operations of the X-ray scanner system 100 (e.g., at least partially responsive to a user input, at least partially responsive to sensor data about operation of X-ray scanner system 100, or both, without limitation). As a non-limiting example, the control system 126 may be configured to automatically and dynamically control the rate at which the support 108 moves through the examination region 110, the rate at which support 108 translates objects through examination region 110, the rate at which the rotor 106 rotates relative to the stator 104, activation, deactivation, and output level of (e.g., intensity of radiation emitted by) the radiation source(s) 114, or any combination or subcombination of these operating parameters. In one or more embodiments, the control system 126 may also accept manual override instructions from the terminal 122 (e.g., via user input, without limitation) and to issue instructions to the X-ray scanner system 100 to alter the operating parameters of the scanning system based on the manual override instructions. In one or more examples, X-ray scanner system 100 may include a measurement system for estimating weight, size, shape of one or more objects 102, as discussed below.

Figure 1B:
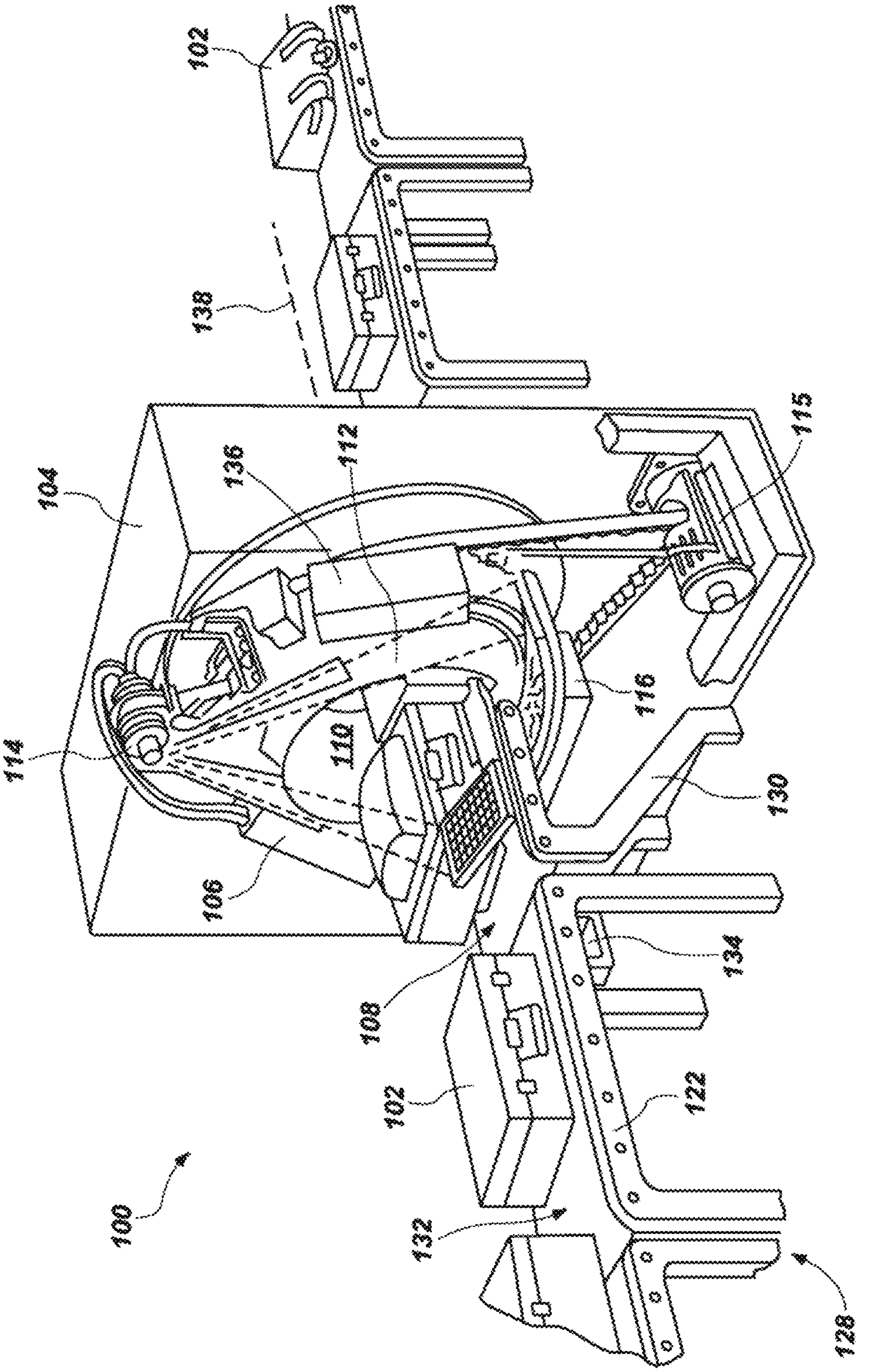
FIG. 1B is a perspective side view of X-ray scanner system of FIG. 1A.

FIG. 1B is a perspective side view of X-ray scanner system 100 of FIG. 1A. Referring to FIG. 1B, the X-ray scanner system 100 may be specifically configured as a baggage scanning system including an explosive detection system. The support 108 of the illustrated X-ray scanner system 100 may be configured as a conveyor system 128 configured to move objects 102 in the form of baggage, luggage, or other passenger items through the examination region 110 of the X-ray scanner system 100 so that helical scans may be performed on one or more objects 102.

The conveyor system 128 may include, for example, belts 132 driven by motors 134 for supporting and transporting the objects 102. The speed of the motors 134 may control the linear rate at which the belts 132 transport the objects 102 supported thereon may proceed through the examination region 110. The control system 126 may issue command signals transmitted to the motors 134 (e.g., via a wireless connection, wired connection, or both without limitation) to vary (e.g., increase or decrease, without limitation) the speed of the motors 134 and associated belts 132. The conveyor system 128 may include, for example, several individual respective conveyors 130 (e.g., one conveyor 130 extending through the examination region 110, another conveyor 130 configured to convey objects 102 toward the X-ray scanner system 100, and another conveyor 130 configured to convey objects 102 away from the X-ray scanner system 100, without limitation); however, other forms of conveyor systems may be used. The different conveyors 130 may be operated at different speeds in accordance with instructions issued by the control system 126.

The X-ray scanner system 100 may include a rotator 115 (e.g., motor, drive shaft, chain, etc.) configured to drive rotation of the rotor 106, and the radiation source(s) 114 and radiation detector(s) 116 supported thereon, relative to the stator 104. The rotator 115 specifically shown in FIGS. 1A and 1B is configured as a motor with a belt or drive wheel mechanically engaged with the rotor 106 to cause the rotor 106 to rotate in response to movement of the motor and drive wheel. The speed of the rotator 115 may control the rotational rate at which the rotor 106 moves the radiation source(s) 114 and radiation detector(s) 116 supported thereby. The control system 126 may issue command signals transmitted to the rotator 115 (e.g., via a wireless or wired connection) to vary the speed of the motors 134 and associated belts 132. The X-ray scanner system 100 may also include shields 136 (e.g., shielding material in or on walls of rotor 106, shielding material hanging at an entrance or exit of X-ray scanning system 100, or both, without limitation), which may include a radiation-blocking material (e.g., Lead or Tungsten) for reducing the likelihood that radiation emitted by the radiation source(s) 114 may propagate beyond the rotor 106 and/or stator 104.

The materials, sizes, and shapes of these hanging energy shields may render them heavy, and the inventors of the subject matter disclosed herein have found that contact between objects and conventional energy shields may cause lighter objects to be displaced by the energy shield. Objects transported through X-ray scanner system 100 may contact shields 136, relying on the force supplied by conveyor system 128 to push the objects past hanging energy shields, after which the energy shields fall down or swing sideways to their lowest positions.

Figure 1C:
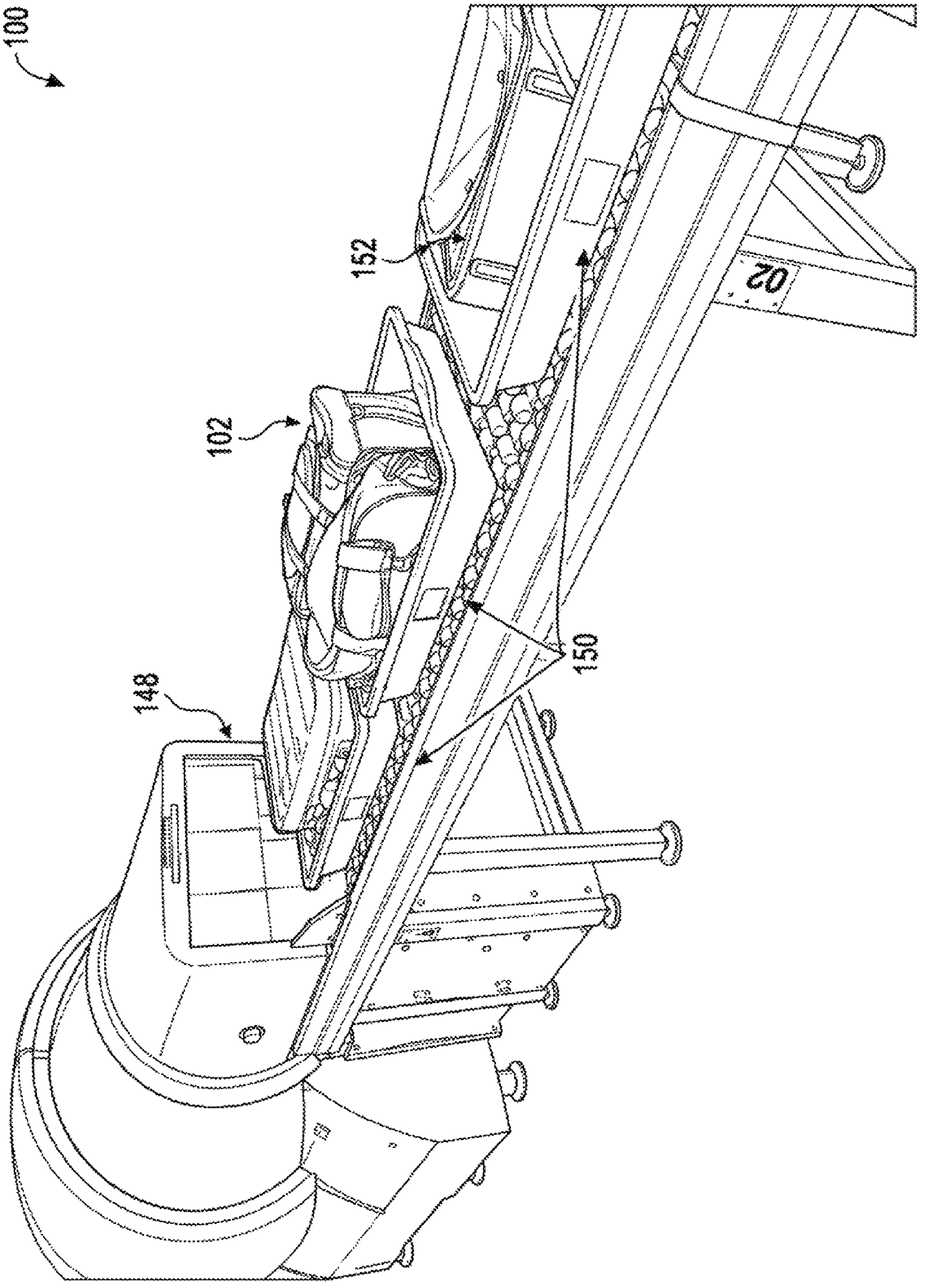
FIG. 1C is a schematic of an X-ray scanner system of FIG. 1A and FIG. 1B performing an example CT scanning.

FIG. 1C is a schematic of an X-ray scanner system 100 of FIG. 1A and FIG. 1B performing an example CT scanning. In the specific embodiment of X-ray scanner system 100 depicted by FIG. 1C, the one or more objects 102 transported through X-ray scanner system 100 are supported by respective tray(s) 150.

Set of rollers are arranged in a frame to define a roller bed. In one or more examples, the roller bed supports tray(s) using multiple wheels or a wide conveyor belt, and may be powered by a motor. The specific non-limiting example tray(s) 150 depicted by FIG. 1C are a type of free standing support that may be manually removed from the conveyor, placed on the conveyor, or re-arranged on the conveyor, though this disclosure is not limited to free stranding supports and supports that are not free standing such as built-in-support, without limitation, are specifically contemplated.

In one or more embodiments, one or more objects 102 may only be accepted for input (e.g., input to examination region 110 of X-ray scanner system 100, without limitation) via entrance 148 of the X-ray scanner system 100 when the objects 102 include a tray 150 within which items 152 may be positioned. For example, operators (e.g., user 120, without limitation) or the control system 126 of the X-ray scanner system 100 may require items 152 to be scanned to be placed within tray(s) 150 sized, shaped, and designated for passage through entrance 148. More specifically, operators of the X-ray scanner system 100 may require items 152 to be scanned to be placed within the tray(s) 150, and the operators may ensure that there is at least a minimum spacing between adjacent tray(s) 150 on the conveyor system 128 or the control system 126 may control movement of the conveyor system 128 to automatically provide for a predetermined minimum spacing between adjacent tray(s) 150. As specific, nonlimiting examples, operators or the control system 126 of the X-ray scanner system 100 may require items 152 to be scanned to be placed within the tray(s) 150, and the operators or control system 126 may ensure that there is a minimum spacing of between about 10 centimeters (cm) and about 20 cm (e.g., about 15 cm) between adjacent tray(s) 150 on the conveyor system 128.

Unlike baggage and cargo carried in a cargo hold of an aircraft, the size and weight of accessible property typically is not measured, notwithstanding that measurement information may be useful. As a non-limiting example, an airline operator may utilize measurement information to manage aircraft takeoff weight and balance, and thereby increase efficiency and save energy (e.g., work or fuel, without limitation). As a non-limiting example, an airline operator may utilize measurement information to provide a passenger with personalized feedback about the passenger's current and planned travel, and to provide third-parties with insights gleaned from analyzing object or item size, weight, size, shape, or content. Other uses of measurement information do not exceed the scope of this disclosure.

Figure 2:
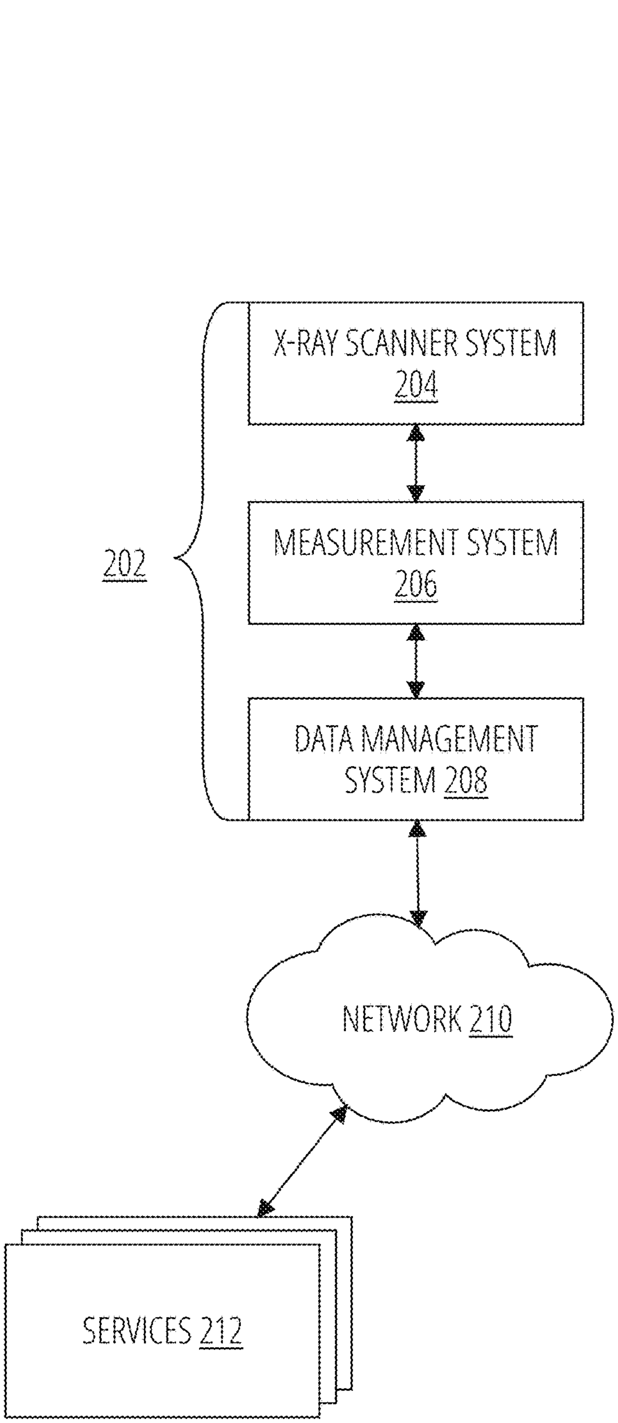
FIG. 2 is a block diagram depicting a system for determining measurement information or objects or items input to an X-ray scanner system 100, in accordance with one or more embodiments.

FIG. 2 is a block diagram depicting a system 200 for determining measurement information or objects or items input to an X-ray scanner system 100, in accordance with one or more embodiments. In the specific embodiment depicted by FIG. 2, system 200 includes X-ray scanner system 204, measurement system 206, and data management system 208.

X-ray scanner system 204 may be configured to scan objects via radiation. The objects may be transported to or from an examination region of X-ray scanner system 204 via a conveyor system. X-ray scanner system 204 may be or include an X-ray scanner system 100. X-ray scanner system 204 may be a Computed Tomography (CT) system (a "CT scanner system") and system 200 may be a checkpoint CT system.

Measurement system 206 may be configured to measure or determine (e.g., directly or indirectly measure via information gleaned by one or more of: an X-ray scanner system, a weigher (e.g., one or more scales, without limitation), or sensors at conveyor system, without limitation) information about one or more physical properties of items, as non-limiting examples, size (i.e., dimension or geometry), shape, or weight of accessible property scanned, or to be scanned, by the X-ray scanner system 204.

Data management system 208 may be configured to generate and manage a record including information about a passenger, accessible property, and images of accessible property generated by the X-ray scanner system 204. In one or more embodiments, such a record may associate information about one or more of: one or more physical properties of an item (e.g., size, shape, or weight of an item, such as accessible property, without limitation), a passenger identifier, passenger flight information (e.g., flight number, airline, without limitation), images of accessible property, classified objects or regions in images (e.g., objects or regions in an image that are tagged (e.g., associated with meta-data or visually information such as text, without limitation)), boundary information (e.g., an outline of an object or region is visually augmented in an image, without limitation), other information characterizing a scan of accessible property, or publicly available information such as flight schedules, flight destinations, or passenger manifests, without limitation.

In one or more embodiments, measurement system 206 may be configured to estimate the total weight of a tray and accessible property therein (e.g., determine a value representative of total weight of the tray and accessible property therein or an approximation thereof, without limitation). The tray may include one or more radio-frequency identification (RFID) tags that include a unique tray identifier (i.e., different than all tray identifiers assigned to other trays) and optionally other information. In one or more embodiments, conveyor system of X-ray scanner system 204 may include an entrance conveyor which includes a weight scale (e.g., one or more of a digital scale, a spring scale, a balance scale, or a load cell, without limitation) and an RFID reader. In a contemplated operation, measurement system 206 determines a total weight value for a tray and accessible property therein via information provided by the weight scale (which may include a weight scale value) of the entrance conveyor. Measurement system 206 or data management system 208 may associate a total weight value, weight scale value, or both with a tray identifier read from an RFID tag by data management system 208.

In one or more embodiments, X-ray scanner system 204 scans the tray and accessible property therein via a volumetric CT scanner. The volumetric CT scanner may be configured to measure the CT density of objects (e.g., a tray, one or more items in the tray, or both, without limitation) in three spatial dimensions. The volumetric CT scanner may provide CT density values generated in response to a CT density measurement of an object performed by the volumetric CT scanner with volumetric data about, or an image of, the object.

In one or more embodiments, the volumetric data is processed via a segmentation algorithm that partitions the volumetric data (e.g., voxels, without limitation) into constituent parts of the object (e.g., segmented objects that correspond to a tray and respective items of accessible property in the tray, without limitation). In one or more embodiments, a classification algorithm identifies a type and labels each segmented object with a type identifier. Respective sizes and CT density information (which CT density information may include information about distribution of CT density information in the CT image) about items in a CT image are determined from the CT image and information about weight (which may include a CT weight value), mass (which may include a CT mass value), or both for the items is determined at least partially based on the respective sizes and respective CT density information determined from the CT images. In one or more embodiments, determined information may be apportioned (e.g., associated with, without limitation) to segmented objects within the CT image at least partially based on distribution of CT density information. By way of non-limiting example, the segmentation algorithm, the classification algorithm, or both may be implemented at the image generator 118, terminal 122, data management system 208, or other digital processing components.

A CT weight value based on CT density information may be determined in addition to, or as an alternative to, a weight scale value by a weight scale included with the entrance conveyor.

A CT weight value based on CT density information may be combined with other weight information, such as a weight scale value from a weight scale included with an entrance conveyor, discussed above.

In one or more embodiments, a weight scale may be pre-set to cancel (e.g., with a predetermined weight value for a tray to subtract from a first weight scale value to obtain a changed weight scale value utilized as the weight scale value, without limitation) or ignore (e.g., via calibration such that the weight scale determines a zero or negligible value for weight scale value based solely on a tray weight, without limitation) tray weight.

In one or more embodiments, the mass of low-density objects in an image may be ignored or corrected. In one or more embodiments, a CT mass value based at least partially on CT density information determined by a volumetric CT scanner may be ignored in response to a determination that the CT density information (e.g., a CT density value or a set of CT density values that represent a CT density distribution, without limitation) does not exceed a predetermined threshold. In one more embodiments, a CT mass value based at least partially on CT density information determined by a volumetric CT scanner may be changed by an adjustment amount. In one or more embodiments, an adjustment amount may be determined at least partially based on a weight scale value, as a non-limiting example, at least partially based on a predetermined relationship between weight scale values and CT density values. In one or more examples, a CT weight value may be set equal to a weight scale value in response to a determination that CT density information does not exceed a threshold or a determination that a an accuracy associated with weight scale values should be utilized instead of an accuracy associated with CT weight values (e.g., a weight scale value may be associated with a different accuracy than an accuracy associated with a CT weight value, and a higher accuracy than offered associated with the CT weight value is required or a highest available accuracy is required, without limitation). Measurement system 206 or data management system 208 may utilize a weight scale value instead of a CT weight value or utilize a CT weight value changed at least partially based on a weight scale value.

In one or more embodiments, image pre-processing may be utilized to reduce the influence of metal artifacts on CT weight values or CT mass values. Such image pre-processing may be performed by X-ray scanner system 204, measurement system 206 or data management system 208, without limitation. As a non-limiting example, a metal artifact may be detected, a contribution of the metal artifact to one or more CT weight value or one or more CT mass values may be determined, and the contribution subtracted from the one or more CT weight values or one or more CT mass values. Multiple metal artifacts may be detected in an image and their respective influences on respective one or more CT weight values or CT mass values reduced.

The data management system 208 may include, or have access to, a data storage device or database (e.g., via a network connection, without limitation) for storing records about a passenger, accessible property, and images of the accessible property generated system 200. Information about one or more physical properties taken on respective trays by a scanning system may be aggregated in the data storage device or database with other records with information about one or more physical properties generated by other scanning systems. This information may be provided to another system, such as an airline system or an airport system, in real-time, or may be collected and stored for further analysis.

Passenger information may be associated with records about accessible property. Passenger information may be or be gleaned from: biometric information may include, as non-limiting examples, a facial ID scanner, a ticket reader (paper ticket or smart device (smart phone, smart watch, implant, without limitation)), a barcode/QR code reader (an application on a smart phone), or a digital ID passed from the customer's phone.

In one or more embodiments, data management system 208 may revert to generic information about a passenger if a passenger does not participate in the process. As a non-limiting example, instead of personal identifiable information, a unique, anonymous identifier may be assigned to the record. In one or more examples, one or more of a checkpoint identifier, a scanning system identifier, a date and a time may be associated with the unique, anonymous identifier so that further information related to an examination or security event may be accessed from the scanner system, or systems that generate additional data feeds.

In one or more embodiments, additional data feeds may be associated with the scanned items or records. Non-limiting examples of additional data feeds include: flight schedules, passenger manifests, weather and seasonal data, time and date. Specific information from additional data feeds, unique identifiers for additional data feeds, or unique identifiers for portions of additional data feeds may be associated with scanned items, images, or records by, as non-limiting example, data management system 208. In one or more embodiments, services 212 may include one or more sources for additional data feeds.

In one or more embodiments, the data management system 208 may deploy one or more trained algorithms to process aggregated records and assist measurement and classification algorithms with learning to measure items (e.g., measure physical properties such as density, weight, size, or shape, without limitation) and classify items and improve the accuracy of the same. In one or more embodiments, a classification algorithm may utilize decision trees or convolutional neural networks (e.g., resNet, without limitation).

In one or more embodiments, system 200 may include services 212 in communication with scanning system 202 via network 210. Network 210 may include one or more wired or unwired (e.g., "wireless") communication networks. Network 210 may include one or more secured links. Scanning system 202 may send information about one or more physical properties, such as informatic about density, weight, size, or shape, to services 212 via network 210. In one or more examples, scanning system 202 may send records to services 212.

Non-limiting examples of services 212 include services that utilize information about one or more physical properties to:

- determine if a passenger's bags are oversized (e.g., determine a passenger accessibly item is oversized), determine that the passenger's bags should be checked or a fee for oversized bags should be charged, at least partially based on bag size or weight values;
- produce estimates of aircraft loading (as a non-limiting example, send information about one or more physical properties to an airline system or airport system to allow determination of the remaining carrying capacity of an airplanes cabin);
- notify an airline system or airport system that a passenger's bags are oversized and that a fee should be assessed;
- provide training data (e.g., weight scale values, without limitation) for supervised or unsupervised training of learned models for threat analysis, measuring physical properties, without limitation;
- to determine bag size and weight for a given passenger type (e.g., by airline status or destination, without limitation).

Figure 3A:
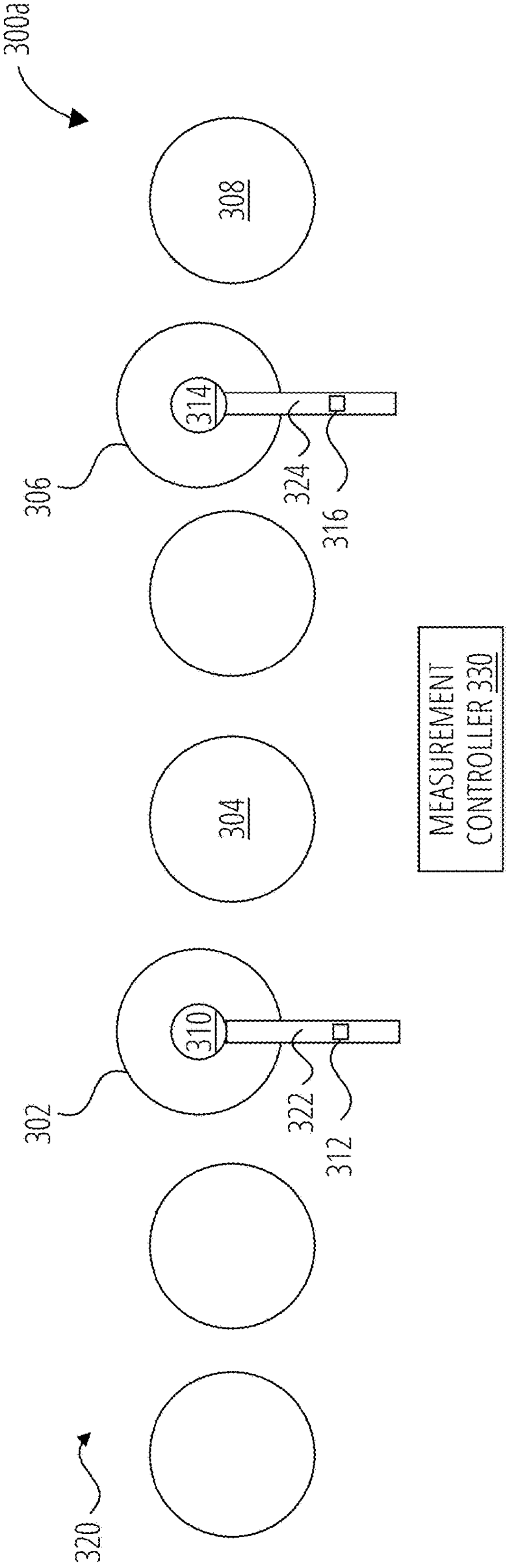
FIG. 3A is a schematic diagram of a weight scale of a measurement system in accordance with one or more embodiments.

FIG. 3A is a schematic diagram of a weight scale 300*a* of a measurement system 206 in accordance with one or more embodiments. In the specific example depicted by FIG. 3A, an entrance or exit conveyor portion 320 is configured as weight scale 300*a*. Multiple proud rollers, here, 302 and 306 are included with rollers 302-308 of entrance or exit conveyor portion 320. Weight scale 300*a* includes multiple load cells, here, load cell 312 and load cell 316 that support roller bearing 310 of proud roller 302 and roller bearing 314 of proud roller 306. Load cells 312 and 316 may be utilized to detect a magnitude of a load supported by proud roller 302 and proud roller 306, respectively. In one or more embodiments, load cell 312 and load cell 316 may detect one or more indications of weight or mass, as non-limiting examples, displacement of proud roller 302 and proud roller 306, respectively, stress or pressure on a material or circuit within support structure 322 and support structure 324, respectively. In one or more examples load cell 312 and load cell 316 may include or be a transducer that generates an electrical signal proportional to a force (or "load") applied to the load cell 312 and load cell 312 or proud roller 302, 304 or 306.

Measurement controller 330 receives the detection signals from the various load cells (e.g., load cell 312 and load cell 316, without limitation) and generates a scale weight value or scale mass value that represents that mass or weight of item(s) present on entrance or exit conveyor portion 320, optionally including, or not including, the weight or mass of a tray.

Figure 3B:
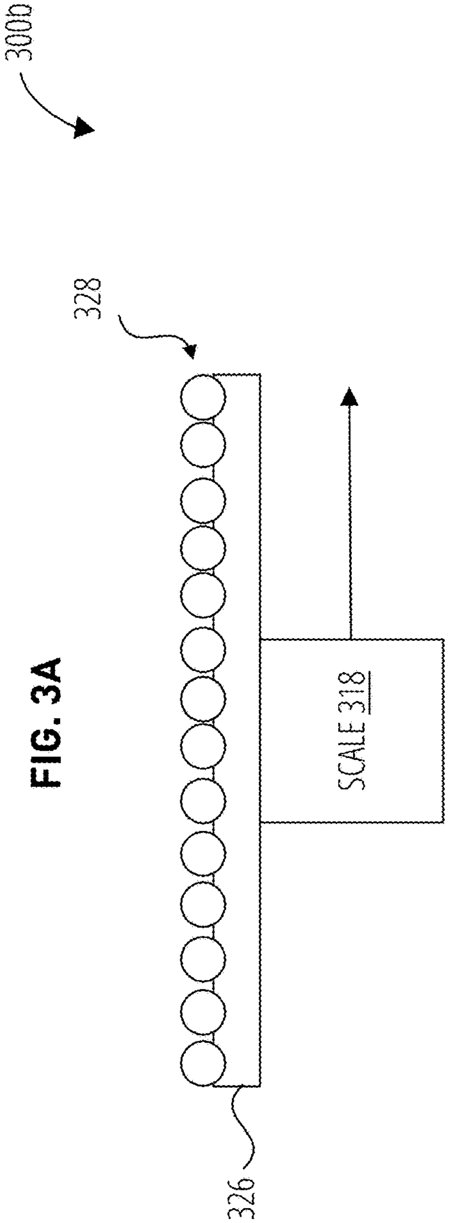
FIG. 3B is a schematic diagram of a weight scale of a measurement system in accordance with one or more embodiments.

FIG. 3B is a schematic diagram of a weight scale 300*b* of a measurement system 206 in accordance with one or more embodiments. In the specific example depicted by FIG. 3B, an entrance or exit conveyor portion 326, which conveyance portion 326 includes rollers 328, is supported by a scale 318 that measures the weight or mass on a top surface of scale 318. Non-limiting examples of scale 318 include a mechanical, electronic, or digital weigher, or a combination or subcombination thereof.

Figure 4:
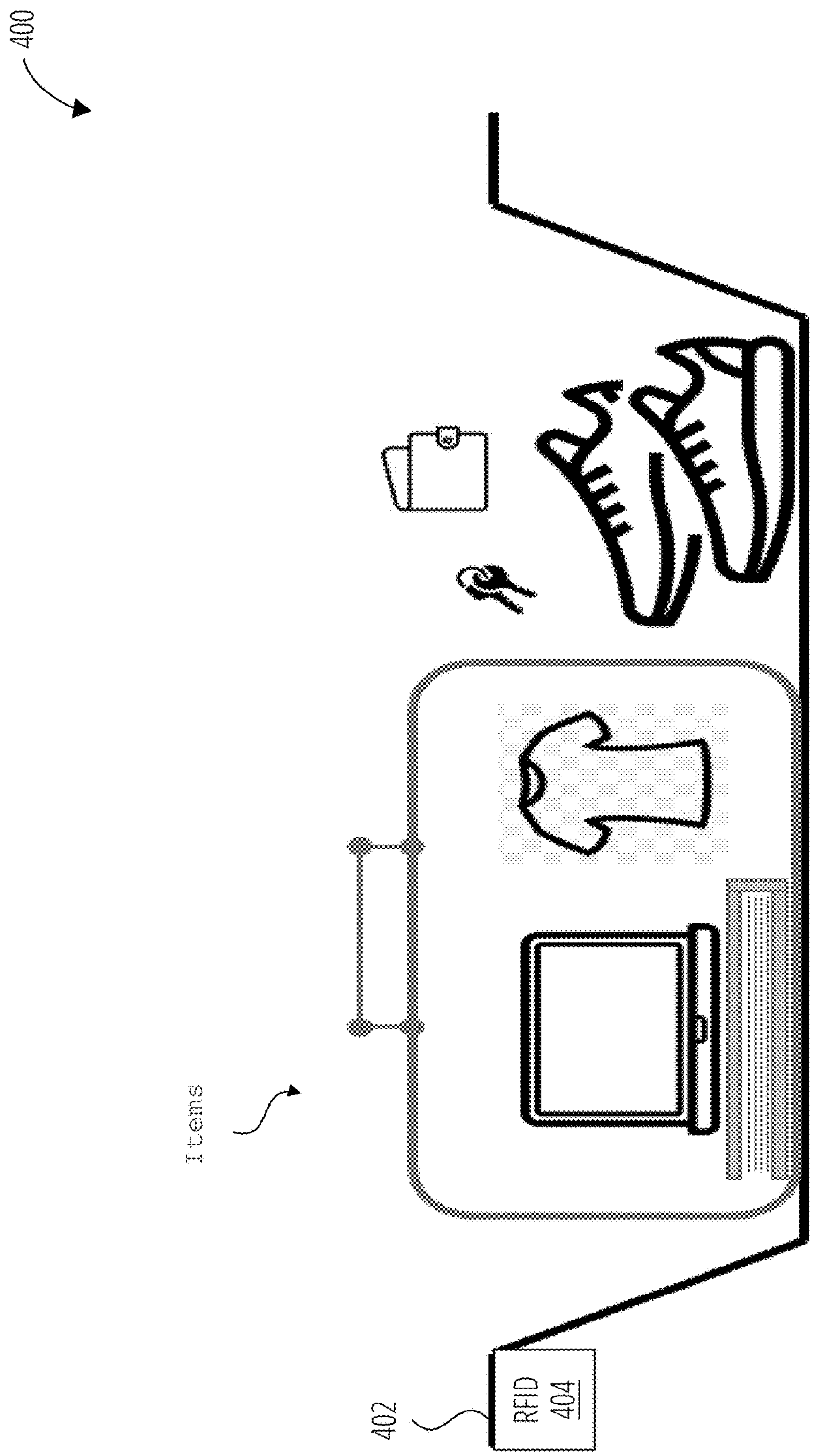
FIG. 4 is a schematic diagram of a conveyed tray in accordance with one or more examples.

FIG. 4 is a schematic diagram of a conveyed tray system 400 in accordance with one or more examples. Conveyed tray system 400 includes tray 402 configured to support and define a set of items that are accessible property of a passenger. An RFID 404 secured to tray 402 includes information about one or more of the tray 402 or X-ray scanner system. Conveyed tray system 400 is a non-limiting example of a tray, including items, conveyed by conveyors 130 toward an entrance 148 of an X-ray scanner system 100, such as entrance or exit conveyor portion 320 of FIG. 3A or FIG. 3B and whose weight or mass may be measured and values thereof recorded.

Figure 5:
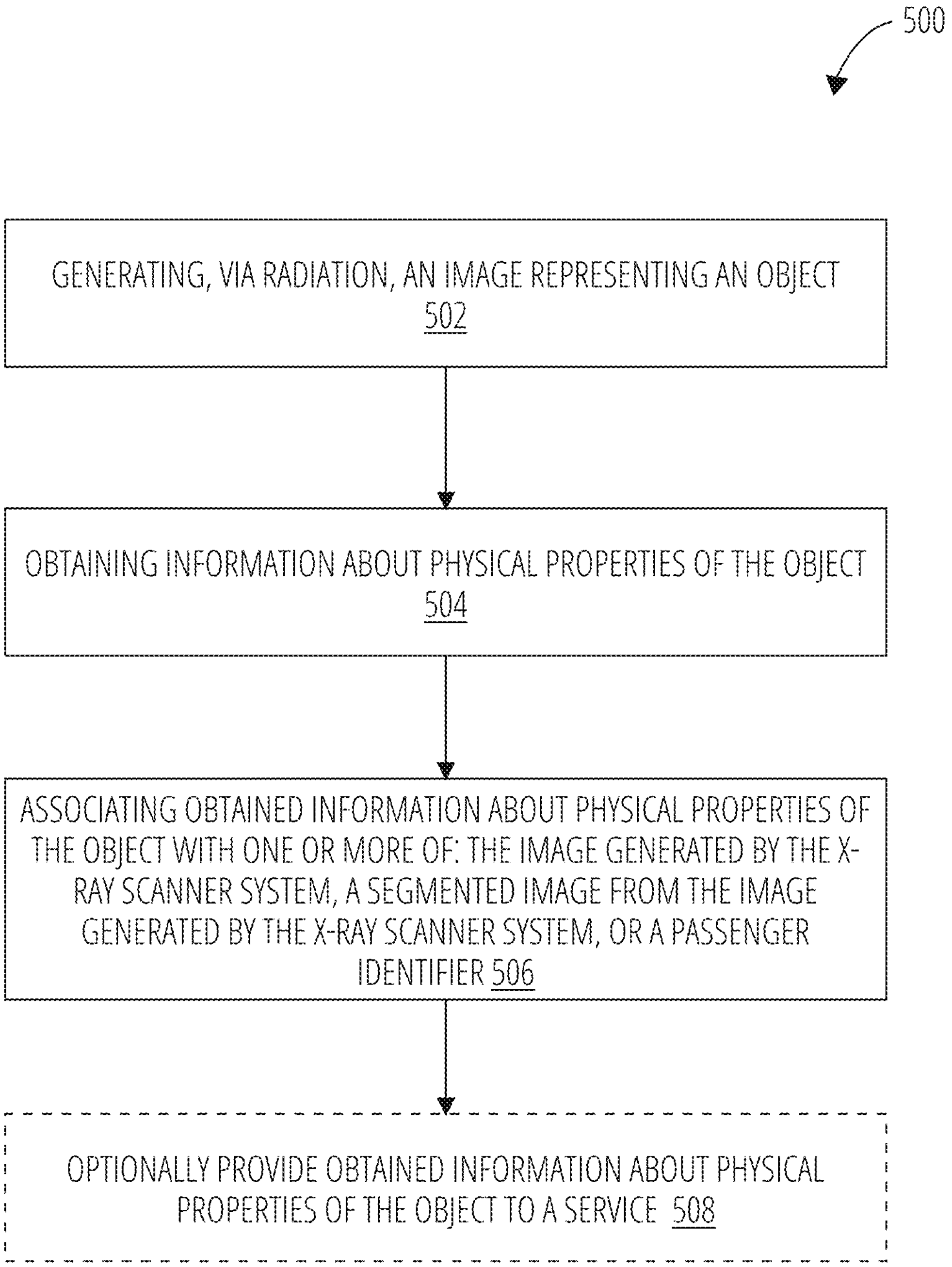
FIG. 5 illustrates an example process for determining measurement information or objects or items input to an X-ray scanner system, in accordance with one or more examples.

FIG. 5 illustrates an example process 500 for determining measurement information or objects or items input to an X-ray scanner system 100, in accordance with one or more examples. Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

According to one or more embodiments, the process 500 includes generating, via radiation, an image representing an object at operation 502.

According to one or more embodiments, the process 500 obtaining information about physical properties of the object at operation 504. In one or more embodiments, information about physical properties of the object may be obtained from image data of the image, volumetric image data of the image, segmented image data of the image data of the image, segmented volumetric image data of the volumetric image data of the image, or a segmented image based on the image. In one or more embodiments, information about physical properties of the object may be obtained by measurement of the object. In one or more examples obtained information about physical properties of the object may include information about one or more of: density, mass, weight, size, or shape. In one or more embodiments, obtained information about physical properties of the object may include one or more of: a CT density value, a CT density distribution value, a set of CT density values that represent a CT density distribution, a CT mass value, a CT weight value, dimension values (e.g., x value, y value, z value (e.g., respectively for length, width height, without limitation) without limitation), a weight scale value, combinations of the same, or subcombinations of the same.

According to one or more embodiments, the process 500 includes associating obtained information about physical properties of the object with one or more of: the image generated by the X-ray scanner system, a segmented image from the image generated by the X-ray scanner system, or a passenger identifier at operation 506.

According to one or more embodiments, the process 500 may optionally include providing the determined physical properties of the object to a service at operation 508. The service may be, as non-limiting examples, an airline service, an airport service, a threat analysis service. In one or more examples, process 500 may optionally include providing the determined physical properties of the object to multiple services.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). The term "each" should be interpreted as "some or a totality." The term "each and every" means a "totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples include:

Example 1: An apparatus, comprising: an X-ray scanner system configured to generate, via radiation, an image representing an object; a measurement system configured to determine information about physical properties of the object; and a data management system configured to associate determined physical properties of the object with one or more of: the image generated by the X-ray scanner system, a segmented image from the image generated by the X-ray scanner system, or a passenger identifier.

Example 2: The apparatus according to Example 1, wherein the measurement system configured to determine a CT weight value representative of weight of the object represented by the image at least partially based on a CT density value representative of density of the object represented by the image.

Example 3: The apparatus according to any of Examples 1 and 2, wherein the measurement system is configured to obtain the CT density value from the X-ray scanner system.

Example 4: The apparatus according to any of Examples 1 through 3, wherein the X-ray scanner system configured to determine the CT density value at least partially based on volumetric data, wherein the X-ray scanner system configured to generate the image at least partially based on the volumetric data.

Example 5: The apparatus according to any of Examples 1 through 4, wherein the measurement system configured to change the CT weight value at least partially based on a weight scale value.

Example 6: The apparatus according to any of Examples 1 through 5, wherein the measurement system configured to set the CT weight value to the weight scale value at least partially responsive to a determination that the CT density value do es not exceed a predetermined threshold.

Example 7: The apparatus according to any of Examples 1 through 6, wherein the measurement system configured to set the CT weight value to the weight scale value at least partially responsive to a determination that an accuracy of the weight scale value is higher than an accuracy of the CT weight value.

Example 8: The apparatus according to any of Examples 1 through 7, wherein the X-ray scanner system to generate a segmented image at least partially via segmentation of the image representing the object.

Example 9: The apparatus according to any of Examples 1 through 8, wherein the measurement system includes a weight scale.

Example 10: The apparatus according to any of Examples 1 through 9, wherein the weight scale is integrated with a conveyor of the X-ray scanner system.

Example 11: The apparatus according to any of Examples 1 through 10, wherein the weight scale comprises: a proud roller of the conveyor of the X-ray scanner system; and a transducer configured to generate an electrical signal proportional to force applied to the proud roller.

Example 12: The apparatus according to any of Examples 1 through 11, wherein the data management system to generate a record including determined physical properties of the object represented by the image, a passenger identifier, and the image, and wherein the data management system to provide the record to one or more services via a network.

Example 13: A system, comprising: a data management system to gather and associate information about a passenger, a passenger accessible property, and one or more physical properties of the passenger accessible property; and one or more services in communication with the data management system, the one or more services including digital services at least partially based information about the passenger, the passenger accessible property, and the one or more physical properties of the passenger accessible property.

Example 14: The system according to Example 13, wherein the data management system to: gather ticket identification/biometric identification/digital identification from a mobile device; and link a record including determined physical parameters of accessible property with a digital identity.

Example 15: The system according to any of Examples 13 and 14, wherein the digital identity includes one or more of a passenger record, a government record, or a name.

Example 16: The system according to any of Examples 13 through 15, wherein the one or more services include a service configured to determine the remaining carrying capacity of an airplane.

Example 17: The system according to any of Examples 13 through 16, wherein the one or more services include a service configured to determine whether the passenger accessible property is oversized and generate a notification of the same.

Example 18: A method, comprising: generating, via radiation, an image representing an object; obtaining information about physical properties of the object; and associating determined information about physical properties of the object with one or more of: the image generated by an X-ray scanner system, a segmented image from the image generated by the X-ray scanner system, or a passenger identifier.

Example 19: The method according to Example 18, wherein generating, via radiation, the image representing the object comprises: generating, via computed tomography (CT) scanning, the image representing the object.

Example 20: The method according to any of Examples 18 and 19, wherein determining information about physical properties of the object comprises: obtaining a computed tomography (CT) weight value of the object represented by the image.

Example 21: The method according to any of Examples 18 through 20, wherein determining information about physical properties of the object comprises: obtaining a weight scale value of the object represented by the image.

Example 22: The method according to any of Examples 18 through 21, wherein determining information about physical properties of the object comprises: changing the CT weight value at least partially based on the weight scale value.

Example 23: The method according to any of Examples 18 through 22, comprising: chanting the CT weight value at least partially based on the weight scale value at least partially responsive to a determination of CT density value does not exceed predetermined threshold.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:

an X-ray scanner system configured to generate, via radiation, an image representing an object;

a measurement system configured to determine information about physical properties of the object; and a data management system configured to associate determined physical properties of the object with one or more of: the image generated by the X-ray scanner system, a segmented image from the image generated by the X-ray scanner system, or a passenger identifier.

2. The apparatus of claim 1, wherein the measurement system is configured to determine a CT weight value representative of weight of the object represented by the image at least partially based on a CT density value representative of density of the object represented by the image.

3. The apparatus of claim 2, wherein the measurement system is configured to obtain the CT density value from the X-ray scanner system.

4. The apparatus of claim 3, wherein the X-ray scanner system is configured to determine the CT density value at least partially based on volumetric data, wherein the X-ray scanner system is configured to generate the image at least partially based on the volumetric data.

5. The apparatus of claim 2, wherein the measurement system is configured to change the CT weight value at least partially based on a weight scale value.

6. The apparatus of claim 5, wherein the measurement system is configured to set the CT weight value to the weight scale value at least partially responsive to a determination that the CT density value does not exceed a predetermined threshold.

7. The apparatus of claim 5, wherein the measurement system is configured to set the CT weight value to the weight scale value at least partially responsive to a determination that an accuracy of the weight scale value is higher than an accuracy of the CT weight value.

8. The apparatus of claim 1, wherein the X-ray scanner system is configured to generate a segmented image at least partially via segmentation of the image representing the object.

9. The apparatus of claim 1, wherein the measurement system includes a weight scale.

10. The apparatus of claim 9, wherein the weight scale is integrated with a conveyor of the X-ray scanner system.

11. The apparatus of claim 10, wherein the weight scale comprises:

a proud roller of the conveyor of the X-ray scanner system; and a transducer configured to generate an electrical signal proportional to force applied to the proud roller.

12. The apparatus of claim 1, wherein the data management system is configured to generate a record including determined physical properties of the object represented by the image, a passenger identifier, and the image, and wherein the data management system is configured to provide the record to one or more services via a network.

13. A method, comprising:

generating, via radiation, an image representing an object;

obtaining information about physical properties of the object; and associating determined information about physical properties of the object with one or more of: the image generated by an X-ray scanner system, a segmented image from the image generated by the X-ray scanner system, or a passenger identifier.

14. The method of claim 13, wherein generating, via radiation, the image representing the object comprises:

generating, via computed tomography (CT) scanning, the image representing the object.

15. The method of claim 13, wherein determining information about physical properties of the object comprises:

obtaining a computed tomography (CT) weight value of the object represented by the image.

16. The method of claim 15, wherein determining information about physical properties of the object comprises:

obtaining a weight scale value of the object represented by the image.

17. The method of claim 16, wherein determining information about physical properties of the object comprises:

changing the CT weight value at least partially based on the weight scale value.

18. The method of claim 16, comprising:

chanting the CT weight value at least partially based on the weight scale value at least partially responsive to a determination of CT density value does not exceed predetermined threshold.

* * * * *